INVENTOR.
BY Robert A. Patrick,
Geo. P. Kimmel
ATTORNEY.

Aug. 18, 1931.  R. A. PATRICK  1,819,968
RUDDERLESS OUTBOARD PROPELLING UNIT DRIVEN FROM AN INBOARD MOTOR
Filed April 16, 1929  4 Sheets-Sheet 4

INVENTOR.
Robert A. Patrick.
BY
Geo. P. Kimmel
ATTORNEY.

Patented Aug. 18, 1931

1,819,968

UNITED STATES PATENT OFFICE

ROBERT A. PATRICK, OF FREEPORT, NEW YORK

RUDDERLESS OUTBOARD PROPELLING UNIT DRIVEN FROM AN INBOARD MOTOR

Application filed April 16, 1929. Serial No. 355,587.

This invention relates to a combined steering and propelling means for boats, more particularly to a rudderless outboard propelling unit driven from an inboard motor, and has for its primary object to provide, in a manner as hereinafter set forth, a unit of the character referred to positioned to oppose the stern of the boat and having as a part thereof means that can be revolved, independent of the power head to 180° or more for the purpose of steering the boat in any direction.

A further object of the invention is to provide, in a manner as hereinafter set forth, an outboard propelling unit driven from an inboard motor and constructed and arranged whereby the use of a rudder or reverse gear is eliminated.

A further object of the invention is to provide, in a manner as hereinafter set forth, an outboard propelling unit driven from an inboard motor and capable of being operated, independent of the motor in a manner as to steer the boat without the employment of a rudder.

A further object of the invention is to provide, in a manner as hereinafter set forth, an outboard propelling means for boats and with said means driven from an inboard motor and including a propelling unit and further including means revolving independent of the prime mover of and bodily carrying the propelling unit for the purpose of steering the boat.

A further object of the invention is to provide, in a manner as hereinafter set forth, a rudderless outboard propelling unit driven from an inboard motor and with the unit including a propelling element and a suspension means for the latter, and with said suspension means capable of being revolved and bodily carrying the propelling unit therewith, and said suspension means when revolved providing for the steering of the boat.

Further objects of the invention are to provide, in a manner as hereinafter set forth, a rudderless outboard propelling unit driven from an inboard motor and which is simple in its construction and arrangement, strong, durable, readily installed with respect to the stern of a boat, thoroughly efficient in its use and for the purpose intended, and comparatively inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views.

Figure 1:
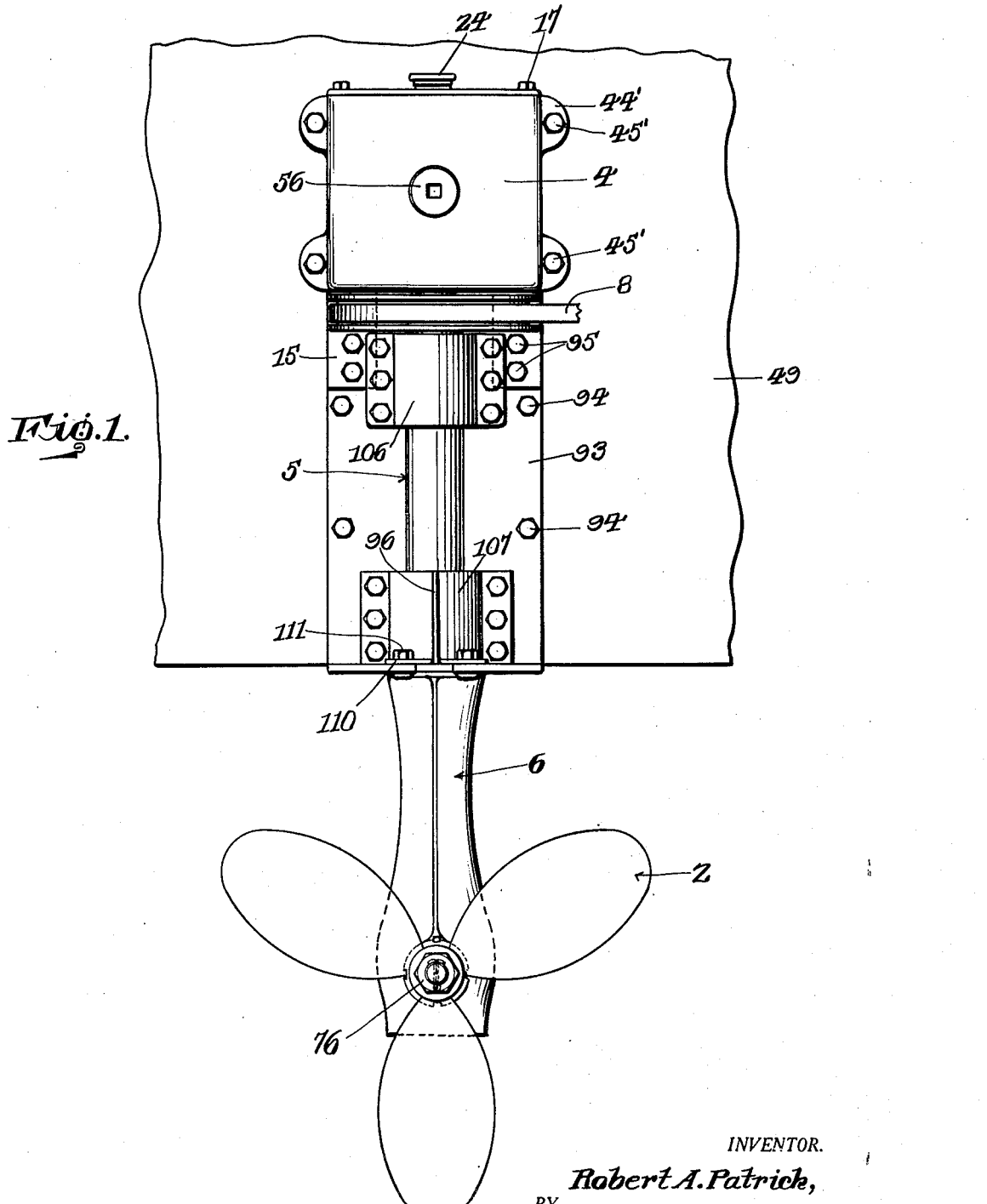
Figure 1 is a rear elevation of a rudderless outboard propelling unit, in accordance with this invention driven from an inboard motor and illustrating the unit attached to the stern of a boat.

A rudderless outboard propelling unit, in accordance with this invention and which is operated from an inboard motor comprises a suspension means or element, a propelling element or means and a combined coupling and spacing means or element and which are generally referred to at 1, 2 and 3 respectively.

The suspension means or element 1 has a portion thereof capable of being revolved and when revolved bodily carries the element 2 therewith. That portion of the element 1 which bodily carries the element 2 and in connection with the latter constitutes a means for steering the boat.

The element 1 comprises a stationary upper housing 4, a vertically disposed sleeve 5 and a lower housing 6 which is integral with the sleeve 5 above the lower end of the latter. The sleeve 5 depends a substantial distance within the housing 6 and said sleeve 5 and housing 6 are bodily revolved. The sleeve 5 extends to a point in close proximity to the bottom of housing 4 and has fixed to its upper end a wheel 7 capable of being horizontally revolved by any suitable means and by way of example a belt 8 is indicated for such purpose and operated by any form of shift device therefor.

The housing 4 includes a rear wall 9, a forward wall 10, a pair of side walls 11, 12, a bottom wall 13, a depending flange 14 having a portion thereof offset as at 15 and a top wall 16 which is removably connected to the rear and front walls 9, 10 by suitable holdfast devices as at 17. The front wall 10 has integral therewith a forwardly directed sleeve 18 having peripheral threads as indicated at 19. The bottom wall 13 is provided with a centrally disposed opening 20 for a purpose to be presently referred to. The rear wall 9 has an integral, forwardly directed, interiorly threaded, annular collar 21, which registers with an opening 22 provided in said wall 9. The top 16 is formed with an opening 23 having the wall thereof threaded for the reception of a peripherally threaded closure plug 24.

The opening 23 provides means whereby a supply of lubricant can be had to the chamber 25 which is provided by the housing 4. The lower housing 6 is substantially of oval contour in horizontal section and includes a forward wall 26, a rear wall 27, a pair of side walls 28, 29, a bottom 30 and a top 31, the latter having its upper face provided with a boss 32, which surrounds the sleeve 5. The bottom 30 has an enlarged opening 33 and an inset flange 34 which provides a seat. Positioned against the flange 34 and connected therewith by holdfast devices 35, is a closure plate 36 for the opening 33. The sleeve 5 is formed integral with the top 31 at a point between the transverse median thereof and its rear end. The housing 6 at a point in proximity to its lower end inclines forwardly with respect to the housing 4 and said housing 6 extends a substantial distance in advance of the housing 4 and has a portion arranged below the bottom of the boat, the latter to be presently referred to.

The forward wall 26 in proximity to the bottom 30 has an opening 37 and a rearwardly directed, interiorly threaded annular collar 38 which registers with the wall of the opening 37. The rear wall 27 in proximity to the bottom 30 is formed with an opening 39 and a rearwardly directed collar 40 which is interiorly threaded and provides a continuation of the opening 39. The rear wall 27 is furthermore formed with an integral, forwardly directed sleeve 41 which registers with opening 39.

The sleeve 5 has an inset portion 42 at its upper end, an outset portion 43 intermediate its ends, and an inset portion 44 at its lower end. Said inset and outset portions provide for the thickening of the body of the sleeve 5. A support 43' is provided for sleeve 18 and which is secured to the stern of the boat. Apertured ears 44' are provided on the housing 4 for the passage of holdfast devices 45' to secure the housing 4 to the stern of the boat.

The element 2 includes a drive shaft 45, a transmission shaft 46 and a propeller shaft 47. The shafts 45 and 47 are disposed at right angles to the shaft 46. The shaft 45 extends into the boat 48 and is operated from a motor arranged within the latter forwardly of the stern 49 thereof. The bottom of the boat 48 is indicated at 50. The shaft 45 extends into the chamber 25 provided by the housing 4 and is formed with a reduced portion 51 which merges into a reduced portion 52. Shoulders 53, 54 are provided by the reduced portions 51, 52. Mounted on the reduced portion 52 and abutting against the shoulder 54 is a flanged bushing 55 which is maintained in position by an adjusting nut 56 having threaded engagement with the collar 21. The nut 56 closes the opening 22.

Keyed to the shaft 45 and flush with the shoulder 53 is a beveled pinion 57 which abuts against a retaining nut 58 positioned on the portion 51 of shaft 45. The nut 58 abuts against shoulder 53. The sleeve 18 of the wall 10 of the housing 4 extends through an opening 59 provided in the stern 49 and mounted on shaft 45 and arranged in the sleeve 18 is a flanged bushing 60 having its flange 61 abutting against the inner face of the wall 10. Interposed between the flange 61 and the pinion 57 is a thrust bearing 62. The nut 56 abuts the flange 63 of the bushing 55.

The transmission shaft 46 is of a length greater than the sleeve 5 and has its upper portion arranged in the chamber 25 provided by the housing 4 and its lower portion positioned within the lower part of the housing 6 between the collar 38 and sleeve 41. Secured upon the upper end of the shaft 46 is the upper driving gear 64 therefor, which is of the beveled type and meshes with the pinion 57. A retaining nut for the gear 64 is indicated at 65 and which is secured to the shaft 46 against gear 64.

Extending through the opening 20, formed in the bottom 13 of housing 4 and projecting into sleeve 5 is a flanged bushing 66 and with its flange 67 seated on the upper face of bottom 13 of housing 4. Interposed between the flange 67 and gear 64 is the upper thrust bearing 68 for shaft 46. The bushing 66 is positioned against the inset portion 42 of sleeve 5 of shaft 46. Secured to the lower end of shaft 46 is a transmission gear 69 of the beveled type. The shaft 46 has its lower end provided with a securing nut 70 for gear 69. Positioned within the lower portion of sleeve 5 is a flanged bushing 71 and having its flange 72 abutting against the lower edge of sleeve 5.

Interposed between gear 69 and flange 72 is the lower thrust bearing 73 for shaft 46. The bushing 71 is interposed between the inset part of sleeve 5 and shaft 46.

The shaft 47 projects a substantial distance rearwardly or outwardly with respect to the collar 40 and has keyed to the projecting portion thereof, such portion being indicated at 74, a propeller 75. At the outer end of the shaft 47 is a securing means 76 for the propeller 75 and said means threadedly engages with the outer end of shaft 47. The forward or inner end of shaft 47 is provided with a flanged bushing 77 and the flange of the latter is indicated at 78. The shaft 47 intermediate its ends is provided with an annular flange 79 and which is positioned between the transverse median of the shaft 47 and the forward or inner end thereof. The inner end portion 80 of shaft 47 is reduced and also provided with peripheral threads 81. The bushing 77 is mounted on portion 80 of shaft 47 and the non-flanged end of bushing 77 is flush with the inner or forward end edge of shaft 47.

Secured to shaft 47 forwardly of and abutting collar 79 is a driving gear 82 for shaft 47. Engaging with the threaded portion 81 of shaft 47 and abutting against gear 82 is a securing means or nut 83 for the latter. Interposed between nut 83 and the flange 78 of bushing 77 is a thrust bearing 84 for shaft 47. Threadedly engaging with the collar 38, as well as closing opening 37 and abutting against flange 78 of bushing 77 is an adjusting nut 85 for shaft 47. The inner face of collar 40 is grooved as at 86 and extending therein is the flange 87 of a bushing 88 which is arranged in sleeve 41 and surrounds shaft 47. A packing 89 is also positioned in groove 86 and bears against flange 87 of bushing 88. A packing nut 90 threadedly engages with the collar 40 and engaging the outer end of nut 90 is a locking means 91 therefor which is secured to the sleeve 40 by holdfast means 92. The propeller 75 is spaced a substantial distance from the outer end of the nut 90. Gear 82 meshes with gear 69.

From the foregoing construction and arrangement of parts it is obvious that on the operation of shaft 45 motion will be transmitted to the propeller shaft 75 and that when wheel 7 is revolved the sleeve 5 will be carried therewith, which will bodily carry the lower housing 6 and propeller 75 therewith, under such conditions provision is had whereby the boat can be steered without the employment of a rudder and also that the housing 6 can be revolved greater than 90° to provide for a reverse drive when desired.

The element 3 comprises a vertically disposed plate 93 corresponding in width to the width of housing 4 and of materially greater width than the width of housing 6. The plate 93 is secured to the outer face of the stern 49 by holdfast devices 94. The upper end of plate 93 extends under the offset portion 15 of flange 14. Holdfast devices 95 are employed for securing the offset portion 15, to the plate 93 and the plate 93 to the stern 49.

Figure 3:
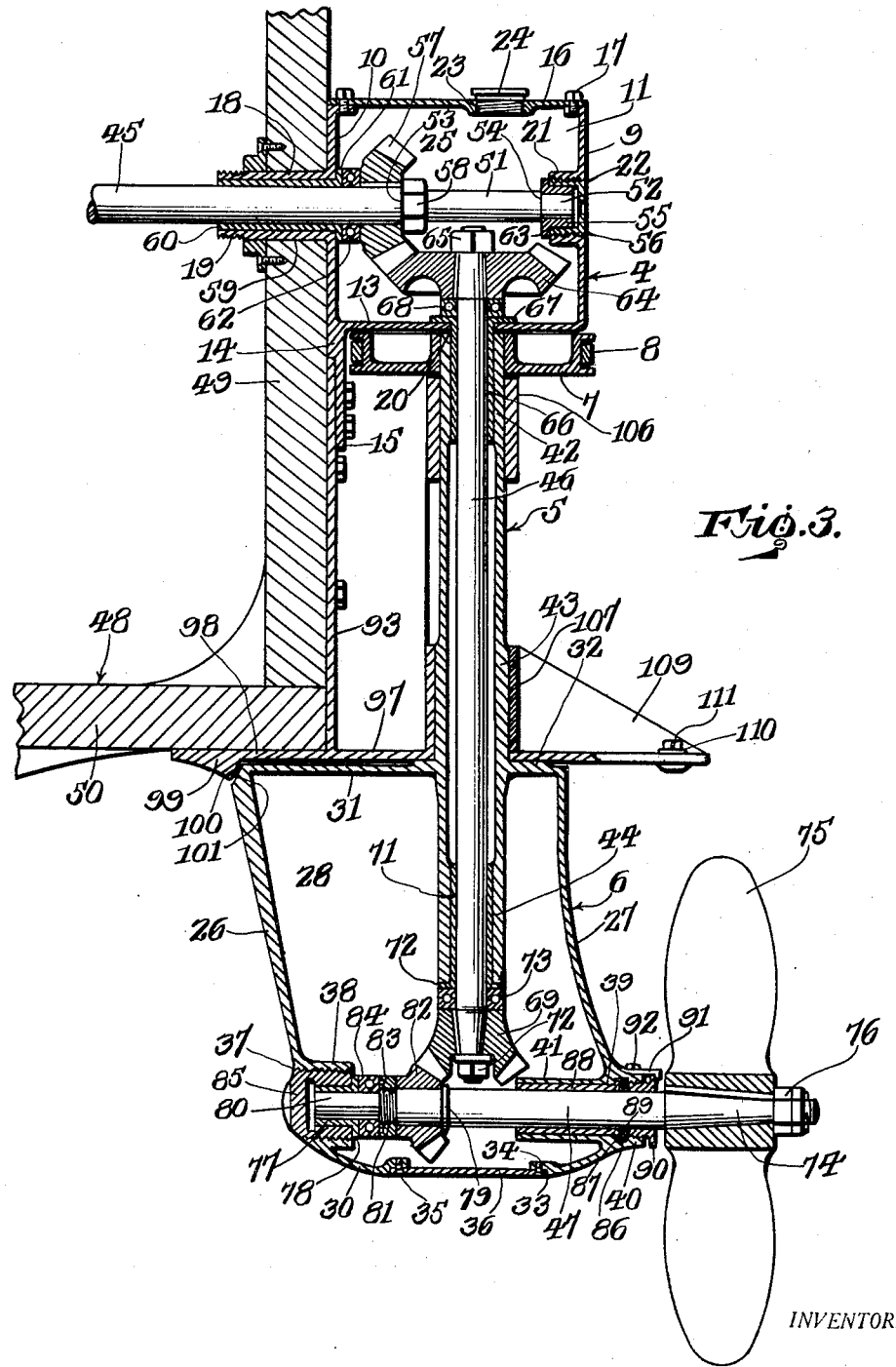
Figure 3 is a vertical sectional view of a rudderless outboard propelling unit in accordance with this invention and illustrating the same installed with respect to the stern of a boat.
Figure 4:
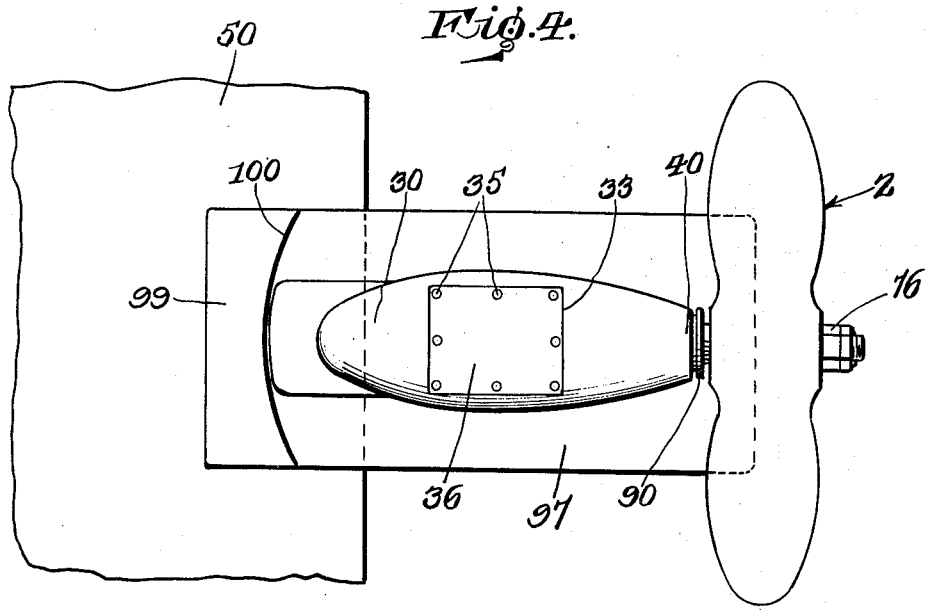
Figure 4 is an inverted plan of the unit.
Figure 5:
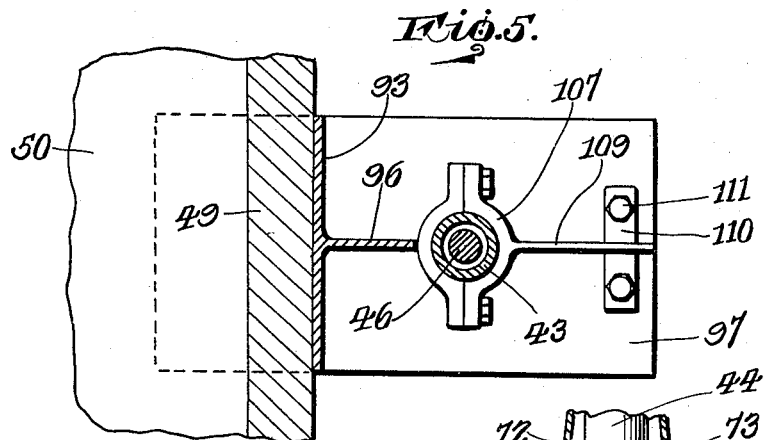
Figure 5 is a section on line 5—5 Figure 2 looking in the direction of the arrows.
Figure 6:
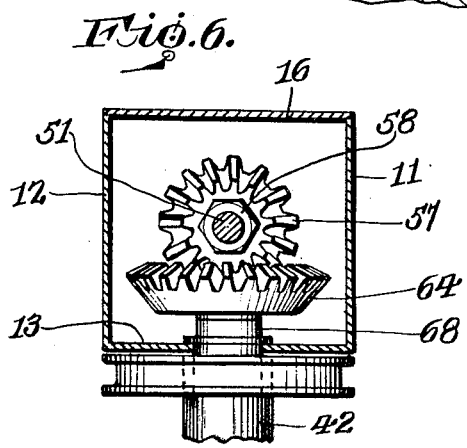
Figures 6 and 7 are sectional details of the unit.
Figure 7:
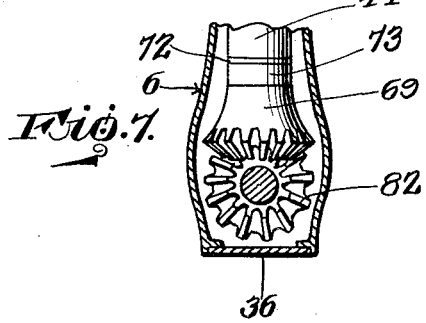

The lower end of plate 93 is flush with the lower end of the stern 49. Formed integral with the plate 93, centrally thereof and extending at right angles thereto is a vertically disposed web 96. The lower end of the web 96, as well as the plate 93 terminates into a horizontally disposed plate 97 which projects rearwardly and forwardly with respect to plate 93 and web 96. The plate 97 corresponds in width to the width of the plate 93. That part of the plate 97 which projects forwardly from plate 93 is indicated at 98 and is arranged below and opposes the bottom 50 of the boat 48. The forward end of plate 97 has a depending enlargement 99 provided with a beveled arcuate rear edge 100, which opposes the beveled, forward upper corner 101 of housing 6. See Figure 3. The plate 97 is of a materially greater width than the width of housing 6 and projects a substantial distance rearwardly therefrom.

Figure 2:
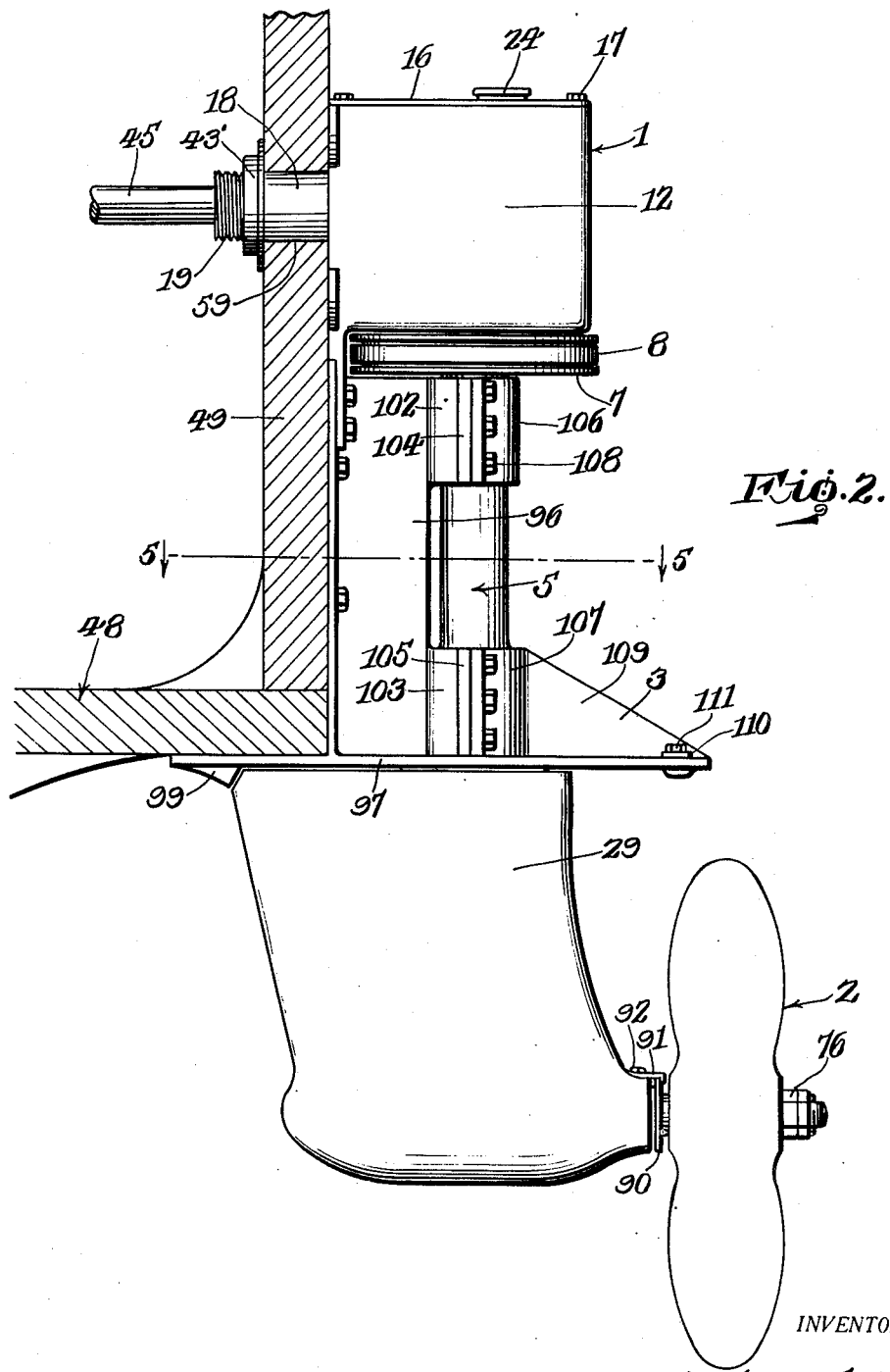
Figure 2 is a fragmentary view in vertical section illustrating the stern of a boat and showing the adaptation therewith of a rudderless outboard propelling unit, in accordance with this invention and with the unit driven from an inboard motor.

Formed integral with the web 96 at its upper and lower ends are bearing sections 102, 103 having oppositely disposed flanges 104, 105 respectively. The section 103 is also integral with the plate 97. The sections 102, 103 project laterally in both directions with respect to the web 96. That portion of the sleeve 5, directly above the top of the housing 6 is arranged within the bearing section 103 and cap member 107. The upper portion of sleeve 5 is positioned between bearing section 102 and cap member 106. The bearing sections and cap members maintain the sleeve 5 in position. The cap sections are provided with oppositely disposed flanges which abut the flanges 104, 105 and are fixedly connected therewith by the holdfast devices 108. That portion of the forward edge of the web 96 which is positioned between the sections 102, 103 is spaced from the sleeve 5. In this connection see Figure 2. The wheel 7 is supported upon bearing section 102 and cap member 106 and provides, in connection with section 102 and cap member 106 for not only suspending the sleeve 5, but further acts to revolve the latter when occasion requires to provide for steering purposes.

Formed integral with the bearing cap section 107 is a rearwardly directed, triangular shaped web 109, provided with laterally extending, apertured arms 110 through which extend holdfast devices 111 for securing the web 109 to the rear end of plate 97. The boss 32, on the top 31 of housing 6 provides a seat for plate 97.

The construction and arrangement of element 3 as set forth, provides for coupling element 1 with the stern of the boat, as well as for maintaining such element in spaced relation with respect to the stern and the bottom of the boat. The bearing section 103 and cap section 107 of element 3 enclose the outset portion 43 of sleeve 5. The bushings 66 and 71 maintain the shaft 46 clear of the inner face of the sleeve 5.

It is thought that the many advantages of a rudderless, outboard propelling unit in accordance with this invention and for the purpose set forth and operated from a motor within a boat can be readily understood, and although the preferred embodiment of the invention is as illustrated and described, yet it is to be understood that changes in the details of construction can be had which fall within the scope of the invention as claimed.

What I claim is:

1. In a rudderless outboard propulsion unit for boats a revoluble housing of substantially oval contour in horizontal section and inclined forwardly from its bottom toward its top to extend under the rear portion of the bottom of the boat, means secured to and projecting rearwardly from the stern of the boat for revolving and suspending said housing below and in rearwardly projecting relation with respect to the rear of the boat bottom, said means including a vertical sleeve connected to the top of and opening and depending into said housing and a wheel for revolving and suspending said sleeve, a driven propeller shaft supported by the lower portion of and having one end extended from the rear of the housing, a propeller on said end and in connection with said housing, when the latter is revolved steering the boat, and means extending through said sleeve and into the housing for driving said propeller.

2. A rudderless outboard propulsion unit for boats comprising a propelling element, a vertically disposed, revoluble suspension element for and bodily moving said propelling element therewith, said propelling element including a propeller, said suspension element enclosing said element other than said propeller, an angle shaped member for connection to the stern of the boat to project rearwardly therefrom and including a vertical and a horizontal web spaced from each other, said suspension element extending between and depending below said webs, upper and lower spaced bearings for and coupling said suspension element to said webs, the upper of said bearings supporting and suspending said suspension element, and said propeller arranged exteriorly of the lower portion of the suspension element and in connection with the latter steering the boat when the suspension element is revolved.

3. A rudderless outboard propulsion unit for boats comprising an upper housing adapted to be secured against the outer face of the stern of the boat, a driven gearing with said housing and operated from a prime mover within the boat, a lower revoluble housing positioned below the stern of the boat and capable when revolved to extend under the bottom of the boat, means secured to and projecting rearwardly from the stern of the boat for revolving and suspending said lower housing below and in rearwardly projecting relation with respect to the rear of the boat bottom, said means positioned below the upper housing and including a vertical sleeve fixedly secured to the top, opening into and depending in said lower housing, said means further including a wheel connected to said sleeve in proximity to the bottom of the upper housing for revolving and suspending said sleeve, a propeller shaft journaled in said lower housing and having one end extended from the rear of the latter, a propeller on said end and in connection with the lower housing when the latter is revolved steering the boat, and means extending from said gearing, through and independent of said sleeve and operatively connected with said shaft for operating it.

4. In a rudderless outboard propulsion unit for boats, a revoluble housing positioned below the stern of the boat and capable when revolved to extend under the bottom of the boat, an enclosed gearing positioned rearwardly of the stern of and operated from a prime mover within the boat, a vertical sleeve having the upper and lower portions of its inner face inset, oppositely disposed, flanged bushings positioned against said portions and having their flanges abutting the ends of the sleeve, said sleeve connected to the top of and opening into and depending in said housing below the top of the latter, a power transmitting shaft extending through said sleeve into said housing surrounded by said bushings and connected at its upper end to said gearing, annular bearing means interposed between the flange of the upper bushing and said gearing, and surrounding said shaft, a propeller shaft carried by the housing and projecting rearwardly therefrom, a gear drive between said shafts, bearing means surrounding the transmitting shaft and interposed between the flange of the lower bushing and said gear drive, means secured to and projecting rearwardly from the stern of the boat and including a revoluble wheel connected to said sleeve for suspending and revolving the latter, and a propeller on the rear of the propeller shaft and in connection with said lower housing when the latter is revolved steering the boat.

In testimony whereof I affix my signature hereto.

ROBERT A. PATRICK.